United States Patent [19]
Daughtry

[11] 3,760,525
[45] Sept. 25, 1973

[54] BAIT-FISH RIG

[76] Inventor: Albert E. Daughtry, 700 Wilkes Dr., Eugene, Oreg.

[22] Filed: July 9, 1971

[21] Appl. No.: 161,135

[52] U.S. Cl. ............................................... 43/44.2
[51] Int. Cl. ............................................ A01k 83/06
[58] Field of Search ........................... 43/44.2, 44.4

[56] References Cited
UNITED STATES PATENTS
| | | | |
|---|---|---|---|
| 2,196,376 | 4/1940 | Anderson | 43/44.2 |
| 2,622,363 | 12/1952 | Bodwell | 43/44.2 |
| 2,565,956 | 8/1951 | Duhamel | 43/44.4 |

FOREIGN PATENTS OR APPLICATIONS
| | | | |
|---|---|---|---|
| 16,612 | 0/1887 | Great Britain | 43/44.2 |

Primary Examiner—Louis G. Mancene
Assistant Examiner—Daniel J. Leach
Attorney—Eugene M. Eckelman

[57] ABSTRACT

A rig for bait fish including a body portion arranged to pierce a bait fish longitudinally and having a forward sharpened head arranged to terminate in the fish's mouth. Such head has a horizontal portion provided with an aperture. Forming a part of the rig is a swivel and a catch having a portion arranged to extend through both the upper and lower jaws of the bait fish and also through the aperture in the head. The catch when closed holds the fish's mouth closed. The rearward end of the body portion supports a fish hook. The body portion is bendable laterally to provide a wobbling motion as the fish is trolled.

1 Claim, 4 Drawing Figures

PATENTED SEP 25 1973

3,760,525

INVENTOR.
ALBERT E. DAUGHTRY
BY E M Eckelman
ATTY.

BAIT-FISH RIG

BACKGROUND OF THE INVENTION

This invention relates to new and useful improvements in bait-fish rigs.

Bait fish such as herring have widespread use as a lure when fishing for salmon or other large fish. For effectiveness of a bait fish as a lure it is desired that it be moved through the water in a manner similar to a live fish and even better in a manner similar to an injured fish, since it has been found that an injured fish is a great attraction for the larger fish. Rigs presently in use employ means to hold a bait fish but because of their structure it is inconvenient to attach such bait fish thereto. Also, in view of the manner of attachment of existing devices to a bait fish, it is difficult also to get the precise action of a live fish and more particularly an injured live fish.

SUMMARY OF THE INVENTION

According to the present invention and forming a primary objective thereof, there is provided a bait-fish rig having improved features which hold a bait fish in a manner providing an effective attraction for the larger fish.

A more particular object of the present invention is to provide a bait-fish rig which employs a body portion capable of piercing a bait fish longitudinally and having forward means which hold the mouth of the bait fish closed so as to assume a natural look.

Another object of the invention is to provide a bait-fish rig of the type described wherein the body portion is of a construction providing longitudinal rigidity for support of the bait fish and at the same time being bendable laterally so that the fisherman can apply a curvature to the fish and cause the fish to wobble as it is moved through the water.

Still another object of the present invention is to provide a bait-fish rig which is inexpensive to manufacture and easy to use.

The invention will be better understood and additional objects and advantages will become apparent from the following description taken in connection with the accompanying drawings which illustrate a preferred form of the device.

DETAILED DESCRIPTION OF A PREFERRED EMBODIMENT

Figure 2:
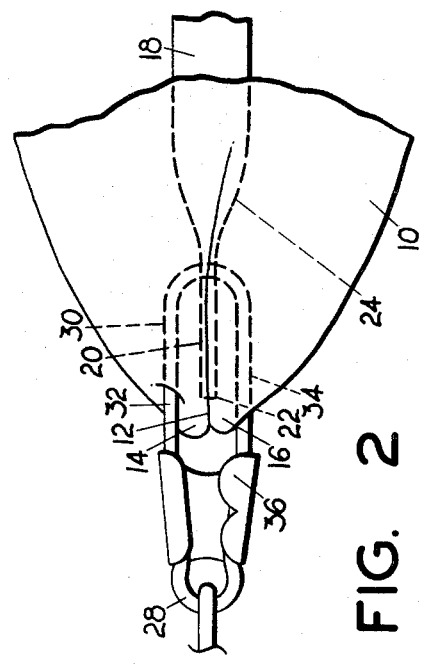
FIG. 2 is an enlarged fragmentary elevational view of a forward portion of the rig as applied to a bait fish.
Figure 4:
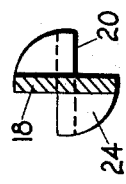
FIG. 4 is an enlarged cross sectional view taken on the line 4—4 of FIG. 1.

Referring in particular to the drawings the numeral 10 designates a bait fish such as a herring which is commonly used as a lure for larger fish. For the purpose of illustrating the present invention the numeral 12 designates the mouth of the fish and numerals 14 and 16 designate the upper and lower jaws which in part define the mouth.

The present invention comprises a rig having a body portion 18. This body portion consists of a strip of bendable metal terminating at its forward end in a head 20 having a front sharpened end 22. Preferably, the body portion 18 has a vertical dimension sufficient to provide vertical rigidity. On the other hand it is sufficiently thin in its lateral dimension such that while it is considerably rigid it can be bent sideways, for a purpose to be described hereinafter.

The head 20 comprises a flat horizontal front portion. Such head may be formed by providing a 90° twist 24 to the body portion on the axis of the latter. Such head is provided with a vertical aperture 26.

Forming a part of the rig is a snap swivel 28 adapted for connection to a fish line L. Swivel 28 employs a catch having curved spring finger 30 having one end 32 attached to the catch and having its other or free end 34 detachably associated with a locking tab 36 of the catch, as in a safety pin structure.

The rearward end of body portion 18 carries a fishhook 38.

In mounting a bait fish on the present rig, the swivel 28 is first detached from the forward end of the body portion by releasing finger 30 from behind tab 36 and disengaging said finger from aperture 26. The body portion 18 is then pushed longitudinally point first into the fish from a lower rearward part of the fish and placed sleectively such that the forward or head end 20 enters through the throat and is positioned in the mouth. Such head end is placed at a selected position such that the aperture 26 is disposed rearwardly of the forward end of the jaws 14 and 16 and also such that the rearward end of the body portion is fully or almost fully embedded in the fish. In a preferred installation, the body portion of the rig is fully embedded in the fish and only the fishhook 38 protrudes. With the head 20 of the body portion assuming a horizontal position, it will be disposed flatwise in the mouth of the fish with the axis of the aperture 26 extending vertically.

Thereupon, the free end 34 of catch finger 30 is passed vertically through the aperture 26 and through both jaws of the fish, either from the top or bottom. The spring finger is then latched in a closed position behind tab 36 to connect the swivel to the body portion 18. Such connected relation of finger 30 to body portion 18 holds the jaws of the fish closed, whereby when the fish is moved through the water its mouth will assume a natural closed appearance. The oval type structure of finger 30 serves effectively to clamp the jaws of the fish shut.

Figure 3:
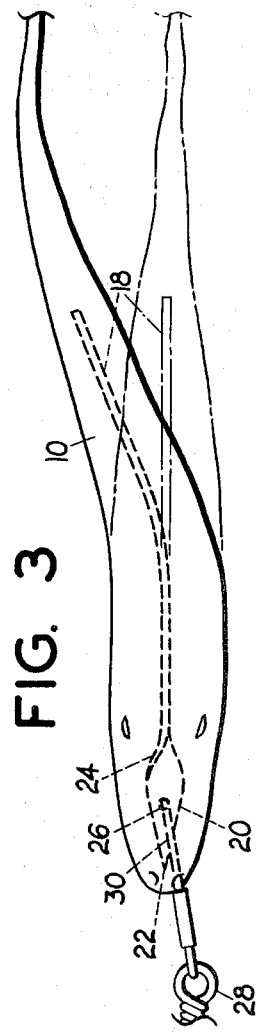
FIG. 3 is a top plan view of the rig also as applied to a bait fish.
Figure 1:
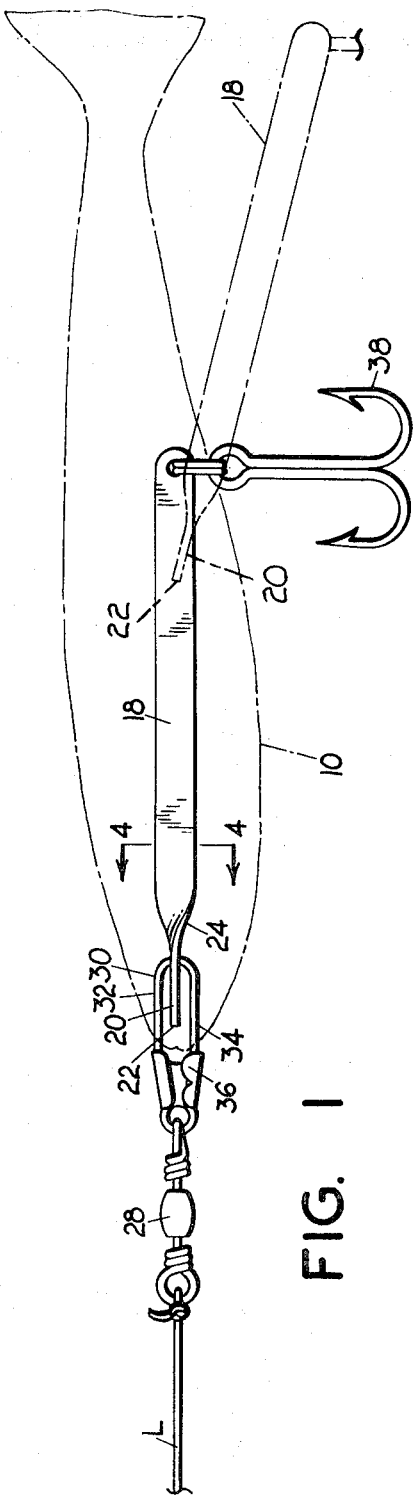
FIG. 1 is a side elevational view of a bait-fish rig employing features of the present invention, a bait fish being shown in phantom lines as mounted on the rig.

It is preferred that the fish be contoured to have a slight curvature so that it will wobble as it is moved through the water, and for this purpose the body portion 18 is bent laterally as desired to apply the necessary curvature. FIG. 3 shows a natural shape of a fish in phantom lines and also shows in solid lines a curved shape caused by bending the body portion 18. The amount of curvature formed in the fish can be varied to simulate a normal swimming fish or even an injured fish, depending upon the desire of the fisherman. As stated hereinbefore, the body portion 18 is rigid vertically and thus maintains straight line support for the bait fish. Although it is clear that the body portion 18 can be curved laterally for the stated purpose, it is to be understood that it has sufficient rigidity in this direction to allow it to be pushed through the flesh of the fish in installation.

It is to be understood that the form of my invention herein shown and described is to be taken as a preferred example of the same and that various changes in the shape, size and arrangement of parts may be resorted to without departing from the spirit of my invention or the scope of the subjoined claim.

Having thus described my invention, I claim:

1. A bait-fish rig including
   a. a body portion,
   b. said body portion comprising an elongated strip having forward and rearward ends,
   c. a sharpened head at the forward end of said body portion whereby said body portion is arranged to pierce a bait fish longitudinally from a rearward point of the fish while in upstanding edge relation with the forward end disposed in the mouth of the bait fish,
   d. a fish hook attached to the rearward end of said body portion,
   e. said head comprising a forward integral portion of said body portion twisted to a plane at right angles to the body portion so that when the body portion is disposed in mounted relation in the bait fish in upstanding edge relation said head is disposed in a horizontal plane in the bait fishs mouth,
   f. said body portion being bendable laterally so that a lateral shaped curvature can be applied to the body of the bait fish,
   g. said head having a length from said sharpened end to said twist substantially no greater than the length of the bait fish's mouth whereby not to interfere with the lateral shaping of said body portion,
   h. means defining a vertically extending aperture in said head,
   i. and a U-shaped latch finger arranged to project through said aperture to connect the body portion to a fish line and also arranged to pierce the jaws of the fish and clamp the jaws closed.

* * * * *